US011955004B2

(12) United States Patent
Shen

(10) Patent No.: US 11,955,004 B2
(45) Date of Patent: Apr. 9, 2024

(54) SIGNAL MACHINE ALARM METHOD AND APPARATUS, ELECTRONIC DEVICE AND READABLE STORAGE MEDIUM

(71) Applicant: APOLLO INTELLIGENT CONNECTIVITY (BEIJING) TECHNOLOGY CO., LTD., Beijing (CN)

(72) Inventor: Donghui Shen, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 203 days.

(21) Appl. No.: 17/658,503

(22) Filed: Apr. 8, 2022

(65) Prior Publication Data

US 2023/0026133 A1 Jan. 26, 2023

(30) Foreign Application Priority Data

Jul. 21, 2021 (CN) ......................... 202110824732.2

(51) Int. Cl.
*G08G 1/07* (2006.01)

(52) U.S. Cl.
CPC ...................................... *G08G 1/07* (2013.01)

(58) Field of Classification Search
CPC .......... G08G 1/07; G08G 1/096; G08G 1/097; G08G 1/085; G08G 1/095; G08G 1/0129; G08G 1/0116; G08G 1/0125; Y02B 20/40
See application file for complete search history.

(56) References Cited

U.S. PATENT DOCUMENTS 10,482,763 B1 11/2019 Pomatto
11,482,106 B2 * 10/2022 Kanade ................ G08G 1/0145
(Continued)

FOREIGN PATENT DOCUMENTS

CN 112634621 A 4/2021
CN 113129591 A 7/2021
WO 2020001223 A1 1/2020

OTHER PUBLICATIONS

First Office Action for CN202110824732.2, dated Aug. 26, 2022, 8 pgs.

*Primary Examiner* — Sisay Yacob
(74) *Attorney, Agent, or Firm* — Kwan & Olynick LLP

(57) ABSTRACT

The present disclosure provides a signal machine alarm method and apparatus, an electronic device and a readable storage medium, and relates to the field of intelligent transportation technologies. The signal machine alarm method, including: acquiring a light-state data stream of a signal machine; determining a target light-state data frame corresponding to a current time according to the light-state data stream; acquiring a timing scheme of the signal machine at the current time; extracting target light-state information of a target phase from the target light-state data frame; and obtaining a calculation countdown according to the timing scheme, the target light color state and the target cycle countdown, and sending alarm information if the calculation countdown is determined to be inconsistent with the target light color countdown. The present disclosure can achieve a purpose of detecting whether the acquired timing scheme is consistent with a timing scheme actually operating in the signal machine, to ensure timely alarm if inconsistency is detected.

12 Claims, 3 Drawing Sheets

(56) References Cited

U.S. PATENT DOCUMENTS

2020/0353932 A1* 11/2020 Wang ........................ G08G 1/04
2022/0172613 A1* 6/2022 Yu ........................ G08G 1/0129

* cited by examiner

SIGNAL MACHINE ALARM METHOD AND APPARATUS, ELECTRONIC DEVICE AND READABLE STORAGE MEDIUM

The present application claims the priority of Chinese Patent Application No. 202110824732.2, filed on Jul. 21, 2021, with the title of "SIGNAL MACHINE ALARM METHOD AND APPARATUS, ELECTRONIC DEVICE AND READABLE STORAGE MEDIUM". The disclosure of the above application is incorporated herein by reference in its entirety.

FIELD OF THE DISCLOSURE

The present disclosure relates to the field of signal machine alarm technologies, and in particular, to the field of intelligent transportation technologies. A signal machine alarm method and apparatus, an electronic device and a readable storage medium are provided.

BACKGROUND OF THE DISCLOSURE

A signal machine in the prior art may be adjusted in real time by means of self-adaption, inductive control or manual control according to a traffic situation at a road intersection. However, due to network transmission, server timing, interface service stability and other factors, a technical problem arises that a timing scheme acquired from the signal machine may be inconsistent with a timing scheme actually operating in the signal machine.

SUMMARY OF THE DISCLOSURE

According to a first aspect of the present disclosure, a signal machine alarm method is provided, including: acquiring a light-state data stream of a signal machine, the light-state data stream including a plurality of light-state data frames arranged in chronological order; determining a target light-state data frame corresponding to a current time according to the light-state data stream; acquiring a timing scheme of the signal machine at the current time; extracting target light-state information of a target phase from the target light-state data frame, the target light-state information including a target light color state, a target light color countdown and a target cycle countdown of the target phase; and obtaining a calculation countdown according to the timing scheme, the target light color state and the target cycle countdown, and sending alarm information if the calculation countdown is determined to be inconsistent with the target light color countdown.

According to a second aspect of the present disclosure, an electronic device is provided, including: at least one processor; and a memory communicatively connected with the at least one processor; wherein the memory stores instructions executable by the at least one processor, and the instructions are executed by the at least one processor to enable the at least one processor to perform a signal machine alarm method, wherein the signal machine alarm method includes: acquiring a light-state data stream of a signal machine, the light-state data stream including a plurality of light-state data frames arranged in chronological order; determining a target light-state data frame corresponding to a current time according to the light-state data stream; acquiring a timing scheme of the signal machine at the current time; extracting target light-state information of a target phase from the target light-state data frame, the target light-state information including a target light color state, a target light color countdown and a target cycle countdown of the target phase; and obtaining a calculation countdown according to the timing scheme, the target light color state and the target cycle countdown, and send alarm information if the calculation countdown is determined to be inconsistent with the target light color countdown.

According to a third aspect of the present disclosure, there is provided a non-transitory computer readable storage medium with computer instructions stored thereon, wherein the computer instructions are used for causing a computer to perform a signal machine alarm method, wherein the signal machine alarm method includes: acquiring a light-state data stream of a signal machine, the light-state data stream including a plurality of light-state data frames arranged in chronological order; determining a target light-state data frame corresponding to a current time according to the light-state data stream; acquiring a timing scheme of the signal machine at the current time; extracting target light-state information of a target phase from the target light-state data frame, the target light-state information including a target light color state, a target light color countdown and a target cycle countdown of the target phase; and obtaining a calculation countdown according to the timing scheme, the target light color state and the target cycle countdown, and sending alarm information if the calculation countdown is determined to be inconsistent with the target light color countdown.

As can be seen from the above technical solutions, in this embodiment, according to the target light-state information obtained from the light-state data stream of the signal machine and the acquired timing scheme, a purpose of detecting whether the acquired timing scheme is consistent with the timing scheme actually operating in the signal machine can be achieved, to ensure timely alarm if inconsistency is detected.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The accompanying drawings are intended to provide a better understanding of the solutions and do not constitute a limitation on the present disclosure. In the drawings.

DETAILED DESCRIPTION OF PREFERRED EMBODIMENTS

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure.

Similarly, for clarity and simplicity, descriptions of well-known functions and structures are omitted in the following description.

Figure 1:
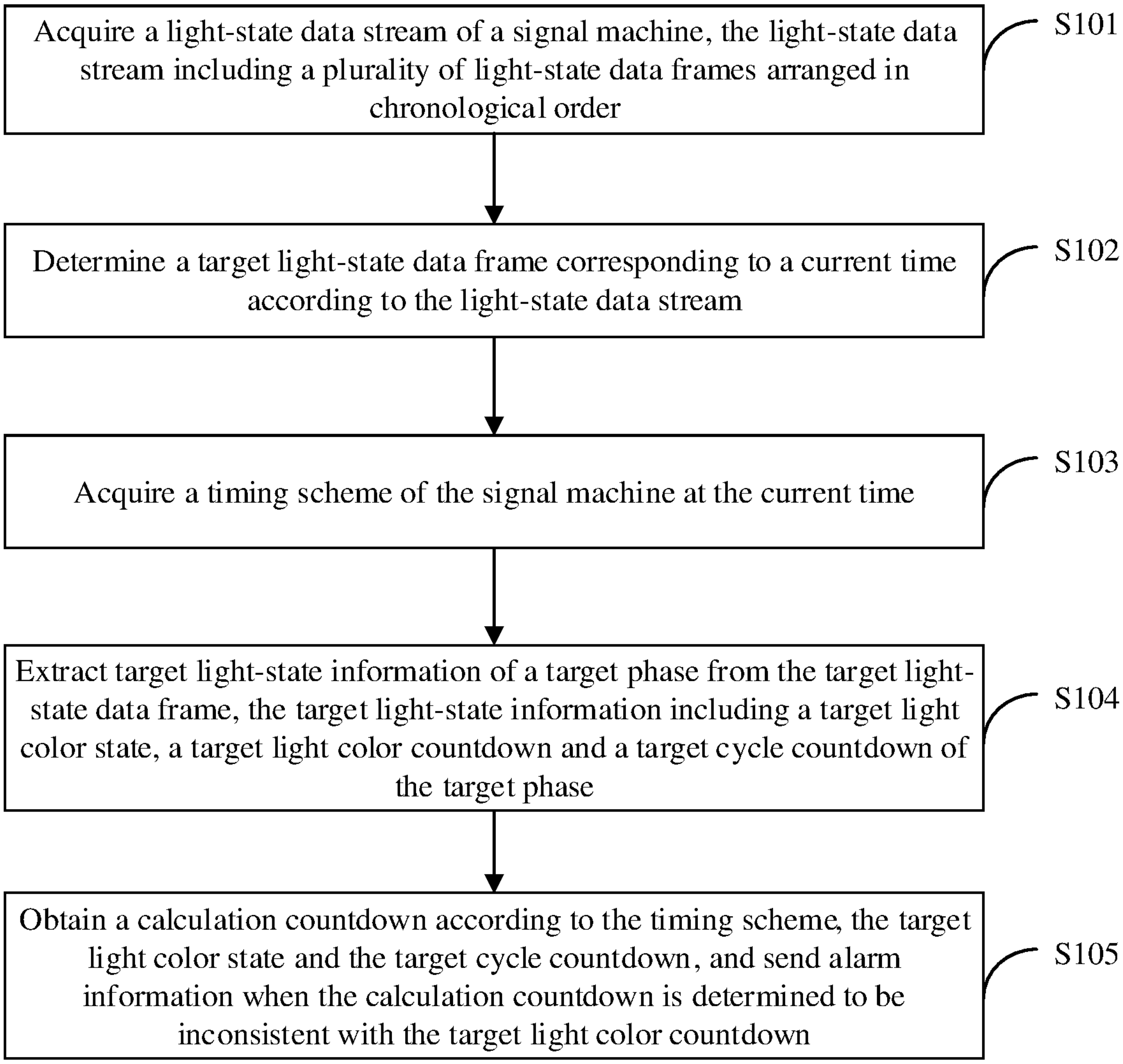
FIG. 1 is a schematic diagram according to a first embodiment of the present disclosure.

FIG. 1 is a schematic diagram according to a first embodiment of the present disclosure. As shown in FIG. 1, a signal machine alarm method according to this embodiment may specifically include the following steps.

In S101, a light-state data stream of a signal machine is acquired, the light-state data stream including a plurality of light-state data frames arranged in chronological order.

In S102, a target light-state data frame corresponding to a current time is determined according to the light-state data stream.

In S103, a timing scheme of the signal machine at the current time is acquired.

In S104, target light-state information of a target phase is acquired from the target light-state data frame, the target light-state information including a target light color state, a target light color countdown and a target cycle countdown of the target phase.

In S105, a calculation countdown according to the timing scheme, the target light color state and the target cycle countdown is obtained, and alarm information is sent if the calculation countdown is determined to be inconsistent with the target light color countdown.

In the signal machine alarm method according to this embodiment, after a target light-state data frame corresponding to a current time is determined according to a light-state data stream of a signal machine, a calculation countdown is obtained by combining a timing scheme of the signal machine at the current time and target light-state information extracted from the target light-state data frame, and alarm information is sent if the calculation countdown is determined to be inconsistent with the target light color countdown, which achieves a purpose of detecting whether the acquired timing scheme is consistent with the timing scheme actually operating in the signal machine, to ensure timely alarm if inconsistency is detected.

It may be understood that the signal machine alarm method according to this embodiment may be performed by the signal machine or a server. The server is configured to receive a light-state data frame at each time sent by the signal machine.

The signal machine in this embodiment is a device for displaying signals. Specifically, the signal machine in this embodiment may be a traffic signal light located at a road intersection. The traffic light corresponds to a plurality of phases, for example, 8 phases, namely, north straight, north left, south straight, south left, west straight, west left, east straight and east left, for controlling the traffic at the road intersection.

In this embodiment, the light-state data stream acquired by performing S101 includes a plurality of light-state data frames arranged in chronological order. Each light-state data frame includes light-state information of all phases of the signal machine at corresponding times. The light-state information of each phase includes information such as a light color state, a light color countdown and a cycle countdown of the phase at a corresponding time.

In this embodiment, after S101 is performed to acquire the light-state data stream, S102 is performed to determine a target light-state data frame corresponding to a current time according to the acquired light-state data stream.

In this embodiment, the light-state data stream acquired by performing S101 may include a wrong light-state data frame. For example, a light-state data frame at a certain time is obtained by copying a light-state data frame at a previous time. Therefore, in this embodiment, when S102 is performed to determine a target light-state data frame, a correct light-state data frame corresponding to the current time is found from the acquired light-state data stream.

Specifically, in this embodiment, when S102 is performed to determine a target light-state data frame corresponding to a current time according to the light-state data stream, an optional implementation may involve: selecting the light-state data frame at the current time from the light-state data stream as a first light-state data frame; selecting the light-state data frame at a time preceding the first light-state data frame as a second light-state data frame; comparing the first light-state data frame with the second light-state data frame; and taking the first light-state data frame as the target light-state data frame corresponding to the current time if it is determined that a comparison result is the first light-state data frame being inconsistent with the second light-state data frame.

If, in this embodiment, S102 is performed to determine that a comparison result is the first light-state data frame being consistent with the second light-state data frame, indicating that the light-state data frame at the current time is a wrong light-state data frame, next time may be taken as the current time in chronological order, the first light-state data frame is taken as the second light-state data frame, and a light-state data frame at the next time is taken as the first light-state data frame for comparison.

In this embodiment, after S102 is performed to determine the target light-state data frame corresponding to the current time, S103 is performed to acquire a timing scheme of the signal machine at the current time. In this embodiment, the current time at which the timing scheme is acquired is consistent with the current time at which the target light-state data frame is determined.

In this embodiment, the timing scheme of the signal machine at the current time acquired by performing S103 is configured for the signal machine to control a light color and a light color countdown of each phase at the current time. The acquired timing scheme includes timing information corresponding to different phases. The timing information of each phase includes information such as a preset light color sequence of the phase and a preset duration of each light color.

In an actual scenario, the traffic at a road intersection changes rapidly. In order to better control the traffic situation at the road intersection, the timing scheme may generally be adjusted in real time by means of self-adaption, inductive control or manual control. However, due to network transmission, server timing, interface service stability and other factors, a problem arises that the adjusted timing scheme cannot notify downstream applications or downstream services in a timely manner.

That is, in this embodiment, the timing scheme of the signal machine at the current time acquired by performing S103 may not be a timing scheme actually operating in the signal machine at the current time. Therefore, there is a need to determine, in combination with the light-state information included in the determined target light-state data frame, whether the acquired timing scheme is the timing scheme actually operating in the signal machine at the current time.

In this embodiment, after S103 is performed to acquire the timing scheme of the signal machine at the current time, S104 is performed to extract target light-state information of a target phase from the determined target light-state data frame. The extracted target light-state information includes a target light color state, a target light color countdown and a target cycle countdown of the target phase.

Specifically, in this embodiment, when S104 is performed to extract target light-state information of a target phase from the determined target light-state data frame, an optional implementation may involve: acquiring traffic data of phases corresponding to the current time, wherein the acquired traffic data may be a number of vehicles and pedestrians in a passing direction corresponding to each phase at the current time; taking the phase whose traffic data meets a preset requirement as the target phase, for example, taking the phase with the largest number of vehicles as the target phase; and extracting light-state information of the target phase from the determined target light-state data frame as the target light-state information.

That is, in this embodiment, the target phase is determined through the traffic data corresponding to each phase, and then the target light-state information of the target phase is extracted from the target light-state data frame, which can further improve the accuracy of the extracted target light-state information.

In addition, in this embodiment, when S104 is performed, a preset phase may also be taken as the target phase, and a randomly selected phase may also be taken as the target phase.

In this embodiment, in the target light-state information extracted by performing S104, the target light color state is a light color of the target phase at the current time, and the target light color countdown is a light color countdown of the target phase at the current time. The target cycle countdown is an intersection cycle time that the target phase has passed at the current time, which is 0 at the beginning of an intersection cycle and is an entire intersection cycle duration at the end of the intersection cycle.

For example, if the target phase is a north straight phase and, in the timing scheme actually operating in the signal machine at the current time, the timing information corresponding to the north straight phase is "First red light R1, 20 s; green light G, 15 s; yellow light Y, 5 s; second red light R2, 10 s", the intersection cycle duration is 50 s. If a target light color state of the north straight phase at the current time is the first red light and the target light color countdown is 15 s, the target cycle countdown of the north straight phase at the current time is 5 s. If the target light color state of the north straight phase at the current time is the green light and the target light color countdown is 10 s, the target cycle countdown of the north straight phase at the current time is 25 s.

In this embodiment, after S104 is performed to extract target light-state information, S105 is performed to obtain a calculation countdown according to the timing scheme, the target light color state and the target cycle countdown and send alarm information if the calculation countdown is determined to be inconsistent with the target light color countdown.

Since the target light-state information extracted from the target light-state data frame corresponds to the timing scheme actually operating in the signal machine at the current time, that is, the target light color state, the target light color countdown and the target cycle countdown included in the target light-state information is accurate, in this embodiment, the calculation countdown obtained according to the timing scheme, the target light color state and the target cycle countdown is compared with the target light color countdown, and it may be determined according to a comparison result whether the acquired timing scheme is consistent with the timing scheme actually operating in the signal machine.

Specifically, in this embodiment, when S105 is performed to obtain a calculation countdown according to the acquired timing scheme, the target light color state and the target cycle countdown, an optional implementation may involve: acquiring at least one calculation formula corresponding to the target phase, wherein the target phase may be determined according to the target light-state information; selecting, from the at least one calculation formula, a calculation formula corresponding to the target light color state as a target calculation formula; and obtaining the calculation countdown according to timing information corresponding to the target phase in the timing scheme and the target cycle countdown by using the target calculation formula.

In this embodiment, a plurality of calculation formulas corresponding to different phases may be preset. Each calculation formula corresponds to a different light color state of the phase.

For example, if the target phase is a north straight phase, the calculation formula corresponding to the north straight phase includes Formula 1, Formula 2, Formula 3 and Formula 4, Formula 1 corresponds to the first red light of the north straight phase, Formula 2 corresponds to the green light of the north straight phase, Formula 3 corresponds to the yellow light of the north straight phase, Formula 4 corresponds to the second red light of the north straight phase, and the target light color state of the north straight phase is the first red light, the calculation countdown is obtained by using Formula 1 in this embodiment.

For example, if, in this embodiment, Formula 1 is "$i_1$=(E-G-Y-R2)-i", Formula 2 is "$i_2$=G-(i-R1)", Formula 3 is "$i_3$=Y-(i-R1-G)", and Formula 4 is "$i_4$=R2-(i-R1-G-Y)"; in the formulas, E denotes an intersection cycle duration, which is a sum of a duration of the first red light, a duration of the green light, a duration of the yellow light and a duration of the second red light; R1 denotes the duration of the first red light; G denotes the duration of the green light; Y denotes the duration of the yellow light; R2 denotes the duration of the second red light; i denotes the target cycle countdown; $i_1$, $i_2$, $i_3$ and $i_4$ denote calculation countdowns corresponding to different light color states respectively.

For example, if, in the timing scheme acquired in this embodiment, the timing information corresponding to the north straight phase is "First red light R1, 20 s; green light G, 15 s; yellow light Y, 5 s; second red light R2, 10 s"; if the target light color state of the north straight phase at the current time is the first red light, the target light color countdown is 15 s and the target cycle countdown is 5 s, the calculation countdown obtained according to Formula 1 is $i_1$=(50 s-155-55-10 s)-5 s=15 s. If the target light color state of the north straight phase at the current time is the yellow light, the target light color countdown is 3 s and the target cycle countdown is 37 s, the calculation countdown obtained according to Formula 3 is $i_3$=5 s-(37 s-20 s-15 s)=3 s.

As can be known from the above examples, in this embodiment, the calculation countdown obtained by performing S105 is consistent with the acquired target light color countdown, indicating that the timing scheme of the signal machine at the current time acquired in this embodiment is consistent with the timing scheme actually operating in the signal machine at the current time.

For example, if, in the timing scheme acquired in this embodiment, the timing information corresponding to the north straight phase is "First red light R1, 15 s; green light G, 10 s; yellow light Y, 5 s; second red light R2, 10 s"; if the target light color state of the north straight phase at the current time is the first red light, the target light color countdown is 15 s and the target cycle countdown is 5 s, the calculation countdown obtained according to Formula 1 is $i_1$=(40 s-10 s-5 s-10 s)-5 s=10 s. The obtained calculation countdown is inconsistent with the target light color countdown, indicating that the timing scheme of the signal machine at the current time acquired in this embodiment is inconsistent with the timing scheme actually operating in the signal machine at the current time.

In this embodiment, after S105 is performed to obtain a calculation countdown, the target light color countdown is compared with the obtained calculation countdown, and alarm information is sent if it is determined that a comparison result is the target light color countdown being inconsistent with the obtained calculation countdown. That is, in this embodiment, the alarm information is sent after it is determined that the acquired timing scheme is inconsistent with the timing scheme actually operating in the signal machine at the current time, so as to prompt downstream applications or downstream services. The timing scheme operating in the signal machine has been updated in real time.

With the above method, in this embodiment, according to the target light-state information obtained from the light-state data stream of the signal machine and the acquired timing scheme, it can be detected whether the acquired timing scheme is consistent with the timing scheme actually operating in the signal machine at the current time, and alarm information is sent if it is determined that they are inconsistent, so as to achieve a purpose of sending a timely alarm to the downstream applications or downstream services.

Figure 2:
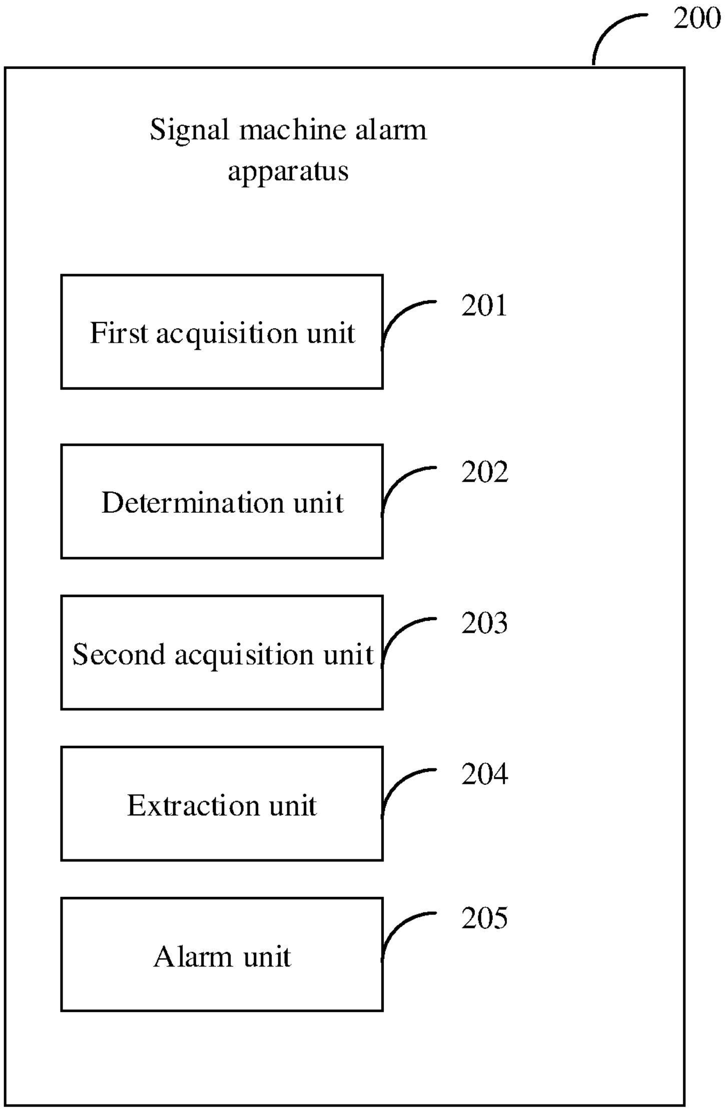
FIG. 2 is a schematic diagram according to a second embodiment of the present disclosure.

FIG. 2 is a schematic diagram according to a second embodiment of the present disclosure. As shown in FIG. 2, a signal machine alarm apparatus 200 according to this embodiment includes:

- a first acquisition unit 201 configured to acquire a light-state data stream of a signal machine, the light-state data stream including a plurality of light-state data frames arranged in chronological order;
- a determination unit 202 configured to determine a target light-state data frame corresponding to a current time according to the light-state data stream;
- a second acquisition unit 203 configured to acquire a timing scheme of the signal machine at the current time;
- an extraction unit 204 configured to extract target light-state information of a target phase from the target light-state data frame, the target light-state information including a target light color state, a target light color countdown and a target cycle countdown of the target phase; and
- an alarm unit 205 configured to obtain a calculation countdown according to the timing scheme, the target light color state and the target cycle countdown, and send alarm information if the calculation countdown is determined to be inconsistent with the target light color countdown.

It may be understood that the signal machine alarm apparatus according to this embodiment may be located at the signal machine or a server. The server is configured to receive a light-state data frame at each time sent by the signal machine.

The light-state data stream acquired by the first acquisition unit 201 includes a plurality of light-state data frames arranged in chronological order. Each light-state data frame includes light-state information of all phases of the signal machine at corresponding times. The light-state information of each phase includes information such as a light color state, a light color countdown and a cycle countdown of the phase at a corresponding time.

In this embodiment, after the first acquisition unit 201 acquires the light-state data stream, the determination unit 202 determines a target light-state data frame corresponding to a current time according to the light-state data stream.

The light-state data stream acquired by the first acquisition unit 201 may include a wrong light-state data frame. Therefore, when the determination unit 202 determines a target light-state data frame, a correct light-state data frame corresponding to the current time is found from the acquired light-state data stream.

Specifically, when the determination unit 202 determines a target light-state data frame corresponding to a current time according to the light-state data stream, an optional implementation may involve: selecting the light-state data frame at the current time from the light-state data stream as a first light-state data frame; selecting the light-state data frame at a time preceding the first light-state data frame as a second light-state data frame; comparing the first light-state data frame with the second light-state data frame; and taking the first light-state data frame as the target light-state data frame corresponding to the current time if it is determined that a comparison result is the first light-state data frame being inconsistent with the second light-state data frame.

If the determination unit 202 determines that a comparison result is the first light-state data frame being consistent with the second light-state data frame, indicating that the light-state data frame at the current time is a wrong light-state data frame, next time may be taken as the current time in chronological order, the first light-state data frame is taken as the second light-state data frame, and a light-state data frame at the next time is taken as the first light-state data frame for comparison.

In this embodiment, after the determination unit 202 determines the target light-state data frame corresponding to the current time, the second acquisition unit 203 acquires a timing scheme of the signal machine at the current time. The current time at which the second acquisition unit 203 acquires the timing scheme is consistent with the current time at which the determination unit 202 determines the target light-state data frame.

The timing scheme of the signal machine at the current time acquired by the second acquisition unit 203 is configured for the signal machine to control a light color and a light color countdown of each phase at the current time. The acquired timing scheme includes timing information corresponding to different phases. The timing information of each phase includes information such as a preset light color sequence of the phase and a preset duration of each light color.

In an actual scenario, the traffic at a road intersection changes rapidly. In order to better control the traffic situation at the road intersection, the timing scheme may generally be adjusted in real time by means of self-adaption, inductive control or manual control. However, due to network transmission, server timing, interface service stability and other factors, a problem arises that the adjusted timing scheme cannot notify downstream applications or downstream services in a timely manner.

That is, the timing scheme of the signal machine at the current time acquired by the second acquisition unit 203 may not be a timing scheme actually operating in the signal machine at the current time. Therefore, there is a need to determine, in combination with the light-state information included in the determined target light-state data frame, whether the acquired timing scheme is the timing scheme actually operating in the signal machine at the current time.

In this embodiment, after the second acquisition unit 203 acquires the timing scheme of the signal machine at the current time, the extraction unit 204 acquires target light-state information of a target phase from the determined target light-state data frame. The target light-state information includes a target light color state, a target light color countdown and a target cycle countdown of the target phase.

Specifically, when the extraction unit 204 extracts target light-state information of a target phase from the determined target light-state data frame, an optional implementation may involve: acquiring traffic data of phases corresponding to the current time; taking the phase whose traffic data meets a preset requirement as the target phase; and extracting light-state information of the target phase from the target light-state data frame as the target light-state information.

That is, the extraction unit 204 determines the target phase through the traffic data corresponding to each phase, and then extracts the target light-state information of the target phase from the target light-state data frame, which can further improve the accuracy of the extracted target light-state information.

In addition, the extraction unit 204 may also take a preset phase as the target phase, or a randomly selected phase as the target phase.

In the target light-state information extracted by the extraction unit 204, the target light color state is a light color of the target phase at the current time, and the target light color countdown is a light color countdown of the target phase at the current time. The target cycle countdown is an intersection cycle time that the target phase has passed at the current time, which is 0 at the beginning of an intersection cycle and is an entire intersection cycle duration at the end of the intersection cycle.

In this embodiment, after the extraction unit 204 extracts target light-state information, the alarm unit 205 obtains a calculation countdown according to the timing scheme, the target light color state and the target cycle countdown and send alarm information if the calculation countdown is determined to be inconsistent with the target light color countdown.

Specifically, when the alarm unit 205 obtains a calculation countdown according to the acquired timing scheme, the target light color state and the target cycle countdown, an optional implementation may involve: acquiring at least one calculation formula corresponding to the target phase; selecting, from the at least one calculation formula, a calculation formula corresponding to the target light color state as a target calculation formula; and obtaining the calculation countdown according to timing information corresponding to the target phase in the timing scheme and the target cycle countdown by using the target calculation formula.

In this embodiment, a plurality of calculation formulas corresponding to different phases may be preset. Each calculation formula corresponds to a different light color state of the phase.

After the alarm unit 205 obtains a calculation countdown, the target light color countdown is compared with the obtained calculation countdown, and alarm information is sent if it is determined that a comparison result is the target light color countdown being inconsistent with the obtained calculation countdown. That is, the alarm unit 205 sends the alarm information after determining that the acquired timing scheme is inconsistent with the timing scheme actually operating in the signal machine at the current time, so as to prompt downstream applications or downstream services. The timing scheme operating in the signal machine has been updated in real time.

Acquisition, storage and application of users' personal information involved in the technical solutions of the present disclosure comply with relevant laws and regulations, and do not violate public order and moral.

According to embodiments of the present disclosure, the present disclosure further provides an electronic device, a readable storage medium and a computer program product.

Figure 3:
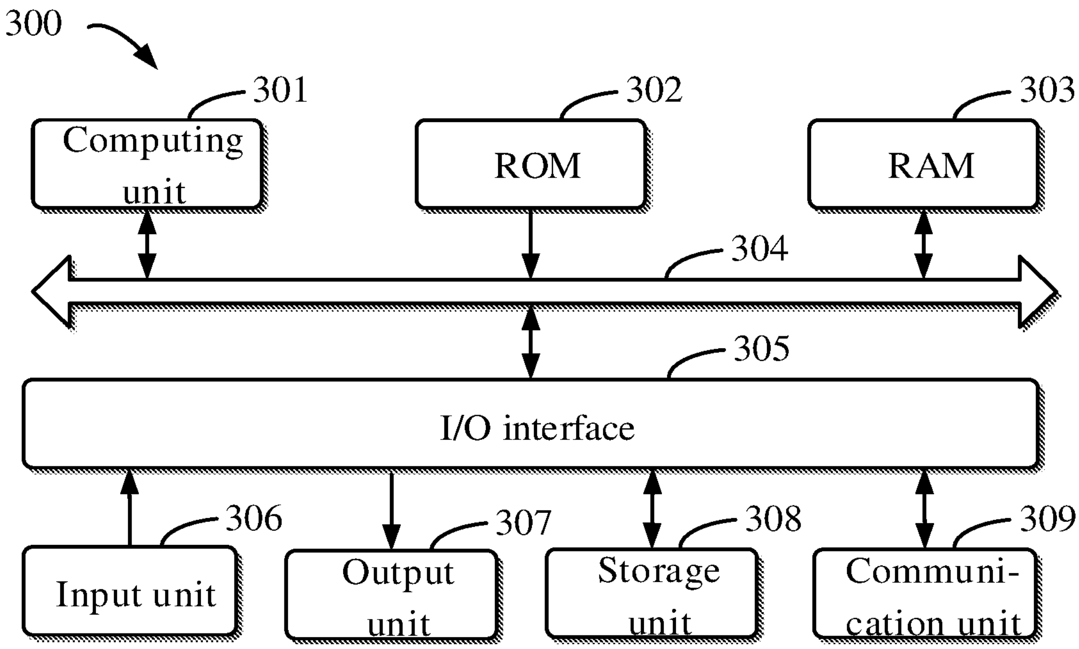
FIG. 3 is a block diagram of an electronic device configured to perform a signal machine alarm method according to embodiments of the present disclosure.

FIG. 3 is a block diagram of an electronic device configured to perform a signal machine alarm method according to embodiments of the present disclosure. The electronic device is intended to represent various forms of digital computers, such as laptops, desktops, workbenches, personal digital assistants, servers, blade servers, mainframe computers and other suitable computing devices. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or required herein.

As shown in FIG. 3, the device 300 includes a computing unit 301, which may perform various suitable actions and processing according to a computer program stored in a read-only memory (ROM) 302 or a computer program loaded from a storage unit 308 into a random access memory (RAM) 303. The RAM 303 may also store various programs and data required to operate the device 300. The computing unit 301, the ROM 302 and the RAM 303 are connected to one another by a bus 304. An input/output (I/O) interface 305 may also be connected to the bus 304.

A plurality of components in the device 300 are connected to the I/O interface 305, including an input unit 306, such as a keyboard and a mouse; an output unit 307, such as various displays and speakers; a storage unit 308, such as disks and discs; and a communication unit 309, such as a network card, a modem and a wireless communication transceiver. The communication unit 309 allows the device 300 to exchange information/data with other devices over computer networks such as the Internet and/or various telecommunications networks.

The computing unit 301 may be a variety of general-purpose and/or special-purpose processing components with processing and computing capabilities. Some examples of the computing unit 301 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 301 performs the methods and processing described above, such as the signal machine alarm method. For example, in some embodiments, the signal machine alarm method may be implemented as a computer software program that is tangibly embodied in a machine-readable medium, such as the storage unit 308.

In some embodiments, part or all of a computer program may be loaded and/or installed on the device 300 via the ROM 302 and/or the communication unit 309. One or more steps of the signal machine alarm method described above may be performed when the computer program is loaded into the RAM 303 and executed by the computing unit 301. Alternatively, in other embodiments, the computing unit 301 may be configured to perform the signal machine alarm method by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable signal machine alarm apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, an RAM, an ROM, an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and a Virtual Private Server (VPS). The server may also be a distributed system server, or a server combined with blockchain.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the extent of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the extent of protection of the present disclosure.

What is claimed is:

1. A signal machine alarm method, comprising:

acquiring a light-state data stream of a signal machine, the light-state data stream comprising a plurality of light-state data frames arranged in chronological order;

determining a target light-state data frame corresponding to a current time according to the light-state data stream;

acquiring a timing scheme of the signal machine at the current time;

extracting target light-state information of a target phase from the target light-state data frame, the target light-state information comprising a target light color state, a target light color countdown and a target cycle countdown of the target phase; and obtaining a calculation countdown according to the timing scheme, the target light color state and the target cycle countdown, and sending alarm information if the calculation countdown is determined to be inconsistent with the target light color countdown.

2. The method according to claim 1, wherein the step of determining a target light-state data frame corresponding to a current time according to the light-state data stream comprises:

selecting the light-state data frame at the current time from the light-state data stream as a first light-state data frame;

selecting the light-state data frame at a time preceding the first light-state data frame as a second light-state data frame;

comparing the first light-state data frame with the second light-state data frame; and taking the first light-state data frame as the target light-state data frame corresponding to the current time if it is determined that a comparison result is the first light-state data frame being inconsistent with the second light-state data frame.

3. The method according to claim 1, wherein the step of extracting target light-state information of a target phase from the target light-state data frame comprises:

acquiring traffic data of phases corresponding to the current time;

taking the phase whose traffic data meets a preset requirement as the target phase; and extracting light-state information of the target phase from the target light-state data frame as the target light-state information.

4. The method according to claim 1, wherein the step of obtaining a calculation countdown according to the timing scheme, the target light color state and the target cycle countdown comprises:

acquiring at least one calculation formula corresponding to the target phase;

selecting, from the at least one calculation formula, a calculation formula corresponding to the target light color state as a target calculation formula; and obtaining the calculation countdown according to timing information corresponding to the target phase in the timing scheme and the target cycle countdown by using the target calculation formula.

5. An electronic device, comprising:

at least one processor; and a memory communicatively connected with the at least one processor;

wherein the memory stores instructions executable by the at least one processor, and the instructions are executed by the at least one processor to enable the at least one processor to perform a signal machine alarm method, wherein the signal machine alarm method comprises:

acquiring a light-state data stream of a signal machine, the light-state data stream comprising a plurality of light-state data frames arranged in chronological order;

determining a target light-state data frame corresponding to a current time according to the light-state data stream;

acquiring a timing scheme of the signal machine at the current time;

extracting target light-state information of a target phase from the target light-state data frame, the target light-state information comprising a target light color state, a target light color countdown and a target cycle countdown of the target phase; and obtaining a calculation countdown according to the timing scheme, the target light color state and the target cycle countdown, and send alarm information if the calculation countdown is determined to be inconsistent with the target light color countdown.

6. The electronic device according to claim 5, wherein the step of determining a target light-state data frame corresponding to a current time according to the light-state data stream comprises:

selecting the light-state data frame at the current time from the light-state data stream as a first light-state data frame;

selecting the light-state data frame at a time preceding the first light-state data frame as a second light-state data frame;

comparing the first light-state data frame with the second light-state data frame; and taking the first light-state data frame as the target light-state data frame corresponding to the current time if it is determined that a comparison result is the first light-state data frame being inconsistent with the second light-state data frame.

7. The electronic device according to claim 5, wherein the step of extracting target light-state information of a target phase from the target light-state data frame comprises:

acquiring traffic data of phases corresponding to the current time;

taking the phase whose traffic data meets a preset requirement as the target phase; and extracting light-state information of the target phase from the target light-state data frame as the target light-state information.

8. The electronic device according to claim 5, wherein the step of obtaining a calculation countdown according to the timing scheme, the target light color state and the target cycle countdown comprises:

acquiring at least one calculation formula corresponding to the target phase;

selecting, from the at least one calculation formula, a calculation formula corresponding to the target light color state as a target calculation formula; and obtaining the calculation countdown according to timing information corresponding to the target phase in the timing scheme and the target cycle countdown by using the target calculation formula.

9. A non-transitory computer readable storage medium with computer instructions stored thereon, wherein the computer instructions are used for causing a computer to perform a signal machine alarm method, wherein the signal machine alarm method comprises:

acquiring a light-state data stream of a signal machine, the light-state data stream comprising a plurality of light-state data frames arranged in chronological order;

determining a target light-state data frame corresponding to a current time according to the light-state data stream;

acquiring a timing scheme of the signal machine at the current time;

extracting target light-state information of a target phase from the target light-state data frame, the target light-state information comprising a target light color state, a target light color countdown and a target cycle countdown of the target phase; and obtaining a calculation countdown according to the timing scheme, the target light color state and the target cycle countdown, and sending alarm information if the calculation countdown is determined to be inconsistent with the target light color countdown.

10. The non-transitory computer readable storage medium according to claim 9, wherein the step of determining a target light-state data frame corresponding to a current time according to the light-state data stream comprises:

selecting the light-state data frame at the current time from the light-state data stream as a first light-state data frame;

selecting the light-state data frame at a time preceding the first light-state data frame as a second light-state data frame;

comparing the first light-state data frame with the second light-state data frame; and taking the first light-state data frame as the target light-state data frame corresponding to the current time if it is determined that a comparison result is the first light-state data frame being inconsistent with the second light-state data frame.

11. The non-transitory computer readable storage medium according to claim 9, wherein the step of extracting target light-state information of a target phase from the target light-state data frame comprises:

acquiring traffic data of phases corresponding to the current time;

taking the phase whose traffic data meets a preset requirement as the target phase; and extracting light-state information of the target phase from the target light-state data frame as the target light-state information.

12. The non-transitory computer readable storage medium according to claim 9, wherein the step of obtaining a calculation countdown according to the timing scheme, the target light color state and the target cycle countdown comprises:

acquiring at least one calculation formula corresponding to the target phase;

selecting, from the at least one calculation formula, a calculation formula corresponding to the target light color state as a target calculation formula; and obtaining the calculation countdown according to timing information corresponding to the target phase in the timing scheme and the target cycle countdown by using the target calculation formula.

* * * * *